United States Patent [19]

Kepplinger et al.

[11] Patent Number: 5,435,832
[45] Date of Patent: Jul. 25, 1995

[54] PROCESS FOR UTILISING IRON-CONTAINING WASTES OR RESIDUES

[75] Inventors: Leopold W. Kepplinger, Leonding; Günter Schrey; Gero Tessmer, both of Linz, all of Austria

[73] Assignee: Deutsche Voest-Alpine, Dusseldorf, Germany

[21] Appl. No.: 237,216

[22] Filed: May 3, 1994

[30] Foreign Application Priority Data

May 7, 1993 [AT] Austria ................. 904/93

[51] Int. Cl.$^6$ .................. C22B 7/02; C21B 13/14
[52] U.S. Cl. ...................... 75/500; 75/468; 75/549
[58] Field of Search ............. 75/500, 549, 468

[56] References Cited

U.S. PATENT DOCUMENTS

| | | | |
|---|---|---|---|
| 2,373,244 | 4/1945 | Holz | 75/468 |
| 2,836,487 | 5/1958 | Fastje | 75/468 |
| 2,894,831 | 7/1959 | Old | 75/10.38 |
| 3,494,763 | 2/1970 | Kato | 75/549 |
| 4,328,030 | 5/1982 | Tozaki | 75/549 |
| 4,854,946 | 8/1989 | Heijwegen | 75/468 |
| 5,139,567 | 8/1992 | Matsuoka | 75/500 |

FOREIGN PATENT DOCUMENTS

| | | |
|---|---|---|
| 376241 | 9/1983 | Austria . |
| 0320999 | 6/1989 | European Pat. Off. . |
| 0364865 | 4/1990 | European Pat. Off. . |
| 4123626 | 1/1993 | Germany . |

Primary Examiner—Peter D. Rosenberg
Attorney, Agent, or Firm—Ostrolenk, Faber, Gerb & Soffen

[57] ABSTRACT

In order to utilise wastes or residues containing iron in the oxide form and/or iron in the metallic form and/or containing carbon (38,25,34), a process is used with which molten pig iron (16) or steel preliminary products can be produced, iron ore (4) being reduced to sponge iron in a direct reduction zone (2), the sponge iron being melted in a melting-gasification zone (15) with the supply of carbon-containing material (29) with gasification of the carbon-containing material (29) to reducing gas, and the reducing gas is fed into the direct reduction zone (2), reacted there and drawn off as top gas.

In order to be able to utilise the wastes or residues completely and in an energy-saving manner, the wastes or residues (38, 25, 34) are collected separately in three groups depending on their chemical composition, namely a first group contains chiefly substances containing iron in the oxide form (38), a second group chiefly substances containing iron in the metallic form (25) and a third group chiefly carbon-containing substances (34), and the first group is charged into the direct reduction zone (2) and the second group and the third group are charged directly into the melting-gasification zone (15).

14 Claims, 1 Drawing Sheet

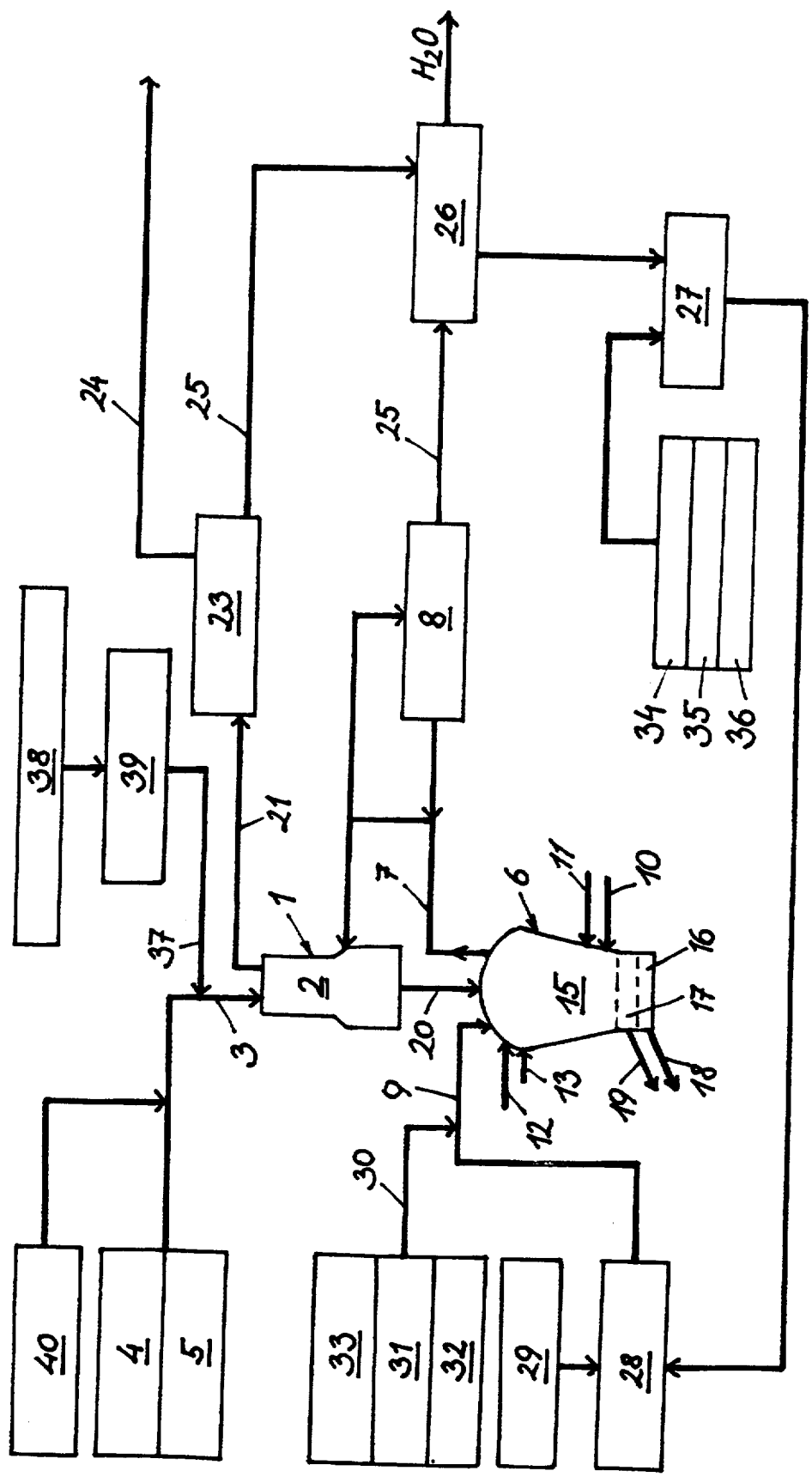

PROCESS FOR UTILISING IRON-CONTAINING WASTES OR RESIDUES

The invention relates to a process for utilising wastes or residues containing iron in the oxide form and/or iron in the metallic form and/or containing carbon, particularly wastes or residues originating from the steel-making industry, with the use of a process for the production of molten pig iron or steel preliminary products, whereby iron ore is reduced in a direct reduction zone to sponge iron, the sponge iron is melted in a melting-gasification zone with the supply of carbon-containing material with gasification of the carbon-containing material to reducing gas, and the reducing gas is fed into the direct reduction zone, reacted there and drawn off as top gas.

A process of said kind is known from AT-B -376.241. In said process, solids particles from the reducing gas and from the top gas emerging from the direct reduction zone are separated in cyclones and the separated solids are mixed with binder, such as iron oxide dust, briquetted and supplied exclusively to the melting-gasification zone, the iron oxide dust originating from a blast furnace gas cleaning plant, so the solids produced in the blast furnace gas cleaning plant may likewise be utilised.

A disadvantage in this case, however, is that as a result of introducing iron oxides, reduction work must be done in the melting unit-gasifier in order to reduce the iron oxide, as a result of which energy required for the melting process is lost from said process.

It is known from DE-A-41 23 626 to agglomerate metallurgical residues without differentiation between oxide and metallic residues, namely with the aid of binders, slag-forming fluxes and reductants, and to introduce the agglomerates into the upper burden region of a melting unit, whereby the preliminary heating and drying of the agglomerates takes place in said burden region of the melting unit. The burden passes through the melting unit according to the counter-current principle, whereby it arrives first in a reducing region provided inside the melting unit and is then melted in the lower region of the melting unit.

Said well-known process is energy-intensive in so far as metallic wastes or residues must also pass through the reducing region of the melting unit.

It is known internally to pelletise dusts, slurries and mill scale from the iron and steel industry, to reduce it in the works' own reduction furnace and to feed the product obtained to the blast furnace. On the one hand, said process requires great expense for treating the wastes and, on the other hand, it does not permit the recycling of all the wastes from iron and steel-making.

The object of the invention is to provide a process with which it is possible to utilise completely all iron-containing wastes or residues, particularly those from the metallurgical industry, with the result that the production of landfill slurries is avoided. In particular, the process should be realisable in an energy-saving manner, i.e. the wastes or residues should undergo the optimal treatment for recycling in each case, depending on their composition.

The object of the invention is achieved in that the wastes or residues are collected separately in three groups depending on their chemical composition, namely a first group contains chiefly substances containing iron in the oxide form, a second group chiefly substances containing iron in the metallic form and a third group chiefly carbon-containing substances, and in that the first group is charged into the direct reduction zone and the second group and the third group are charged directly into the melting-gasification zone.

According to the invention, the first group with chiefly oxide substances and the second group with chiefly metallic substances receives different pretreatments before charging:

Preferably, the chiefly oxide substances are present as fines of ore and/or of ore pellets in the dust form and undergo briquetting before introduction into the direct reduction zone, advantageously the briquettes formed from oxide substances together with ore pellets and/or lump ore and coarse scale obtained being introduced together with the fluxes into the direct reduction zone.

Expediently, slurries containing predominantly metallic particles, obtained when washing the reducing gas and/or the top gas, are dewatered, granulated and then dried, whereupon the granular product is charged into the melting-gasification zone.

Chips, small section and possibly coarse section may advantageously be admixed with the granular product.

Granulation takes place advantageously with the admixture of a binder, burnt lime being admixed advantageously as binder.

Drying of the granular product is carried out preferably in a coal drying plant.

The invention is explained in more detail below on the basis of an embodiment shown in the drawing, the drawing illustrating diagrammatically a plant for carrying out the process according to the invention.

According to the drawing, iron oxide-containing charge materials in lump form 4, such as ore, possibly together with unburnt fluxes 5, are charged from above via a feed line 3 into a direct reduction device designed as a shaft furnace 1, i.e. into the direct reduction zone thereof. The shaft furnace 1 is connected to a melting unit-gasifier 6 in which a reducing gas is generated from carbon sources and oxygen-containing gas, which reducing gas is supplied via a feed line 7 to the shaft furnace 1, a gas cleaning and a gas cooling device 8, designed as a scrubber, being provided in the feed line 7.

The melting unit-gasifier 6 has a feed pipe 9 for solid carbon sources in lump form, optionally several feed lines 10, 11 for oxygen-containing gases and feed lines 12, 13 for the carbon sources which are liquid or gaseous as ambient temperature, such as hydrocarbons, and for burnt fluxes. In the melting unit-gasifier 6 beneath the melting-gasification zone 15 are collected molten pig iron 16 and molten slag 17 which are run off separately, each via its own tapping hole 18, 19.

The charge materials in lump form reduced to sponge iron in the shaft furnace 1 in the direct reduction zone 2 are supplied to the melting unit-gasifier 6 via one or more lines 20, for example, by means of discharge screws. Attached to the upper part of the shaft furnace 1 is a discharge line 21 for the top gas produced in the direct reduction zone 2. Said top gas is fed to a gas cleaning device 23 which is also designed as a scrubber, and is then available for a further use via the export gas line 24.

According to the invention, wastes produced during the gasification and melting process and during the reduction process, and metallurgical wastes and residues are recycled to the iron-producing process:

These are primarily the substances produced in the scrubbers 8 and 23 of the reducing gas and top gas, namely slurries 25 containing predominantly metallic particles. The sludge liquor produced in the scrubbers 8 and 23 is supplied to a thickener 26, thickened there, and the thickened sludge is processed to granular product in a granulating plant 27. The agglomeration to granular product takes place with the use of suitable binders, burnt lime having proved particularly suitable. Said granular product is supplied to a coal drying plant 28 and dried together with the carbon sources 29 supplied to the melting unit-gasifier 6, whereupon the granular product together with the dried carbon sources 29 is introduced into the melting unit-gasifier 6 via feed line 9.

Opening out into the feed line 9 is a further feed line 30 by means of which chips 31, small section and possibly also coarse section 32 and further fluxes 33 may be introduced into the melting unit-gasifier 6.

In addition, coal filter dust 34 and sludge 35 from a central works clarification plant of a metallurgical plant and possibly iron dust 36 may be introduced advantageously into the granulating plant 27, processed to granular product and introduced into the melting unit-gasifier 6.

Opening out into the feed line 3 for the ore is a further feed line 37 by means of which oxide dusts 38 which were processed to briquettes in a briquetting device 39, may be introduced into the direct reduction shaft furnace 1. Oxide dusts are taken to mean in particular fine scale and works dust and filter dusts and the fines of ore and pellets. Coarse scale 40 is likewise charged via feed line 3.

As can be seen from the above description of the figure, the invention makes it possible to utilise all the iron-containing wastes produced in a metallurgical plant, whereby the iron may be present in the oxide or metallic form, in an environmentally friendly and economic recycling process, the material and energy content of the wastes and by-products being utilised in an optimal way. This also applies to the coal dusts produced in a metallurgical plant, which may likewise be utilised in an optimum way according to the invention.

We claim:

1. In a process for making iron in a plant wherein iron ore is first reduced to sponge iron in a direct reduction zone and the sponge iron is converted to pig iron in a melting gasification zone, the improvement which comprises separately collecting residue particles containing predominantly oxides of iron, residue particles containing predominantly metallic iron, and residue particles containing predominantly carbon, and recycling said residue particles containing predominantly oxides of iron into said direct reduction zone and recycling said residues containing predominantly metallic iron and predominantly carbon into said melting gasification zone.

2. A process according to claim 15 wherein said residue particles containing predominantly oxides of iron are present as fines of ore and/or of ore pellets in the dust form, and undergo briquetting before introduction into the direct reduction zone.

3. A process according to claim 15 wherein the briquettes formed from said residue particles together with ore pellets and/or lump ore and coarse scale obtained are introduced together with fluxes into the direct reduction zone.

4. A process according to claim 15 wherein slurries containing predominantly metallic particles, obtained during a washing of the reducing gas from said melting gasification zone and/or the top gas from said direct reduction zone, are dewatered, granulated and then dried, and the dried granular material is charged into the melting gasification zone.

5. A process according to claim 4, wherein small section and optionally coarse section chips are admixed with the granular material.

6. A process according to claim 4, wherein granulation takes place with the admixture of a binder.

7. A process according to claim 6, wherein burnt lime is admixed as binder.

8. A process according to claim 4, wherein the drying of the material is carried out in a coal drying plant.

9. A process according to claim 2 wherein slurries containing predominantly metallic particles, obtained during a washing of the reducing gas from said melting gasification zone and/or the top gas from said direct reduction zone are dewatered, granulated and then dried, and the dried granular material is charged into the melting-gasification zone.

10. A process according to claim 3 wherein slurries containing predominantly metallic particles, obtained during a washing of the reducing gas from said melting gasification zone and/or the top gas from said direct reduction zone, are dewatered, granulated and then dried, and the dried granular material is charged into the melting-gasification zone.

11. A process according to claim 5, wherein granulation takes place with the admixture of a binder.

12. A process according to claim 5, wherein the drying of the granular material product is carried out in a coal drying plant.

13. A process according to claim 6, wherein the drying of the granular material is carried out in a coal drying plant.

14. A process according to claim 7, wherein the drying of the granular material is carried out in a coal drying plant.

* * * * *

UNITED STATES PATENT AND TRADEMARK OFFICE
CERTIFICATE OF CORRECTION

PATENT NO. : 5,435,832
DATED : July 25, 1995
INVENTOR(S) : Kepplinger et al.

It is certified that error appears in the above-indentified patent and that said Letters Patent is hereby corrected as shown below:

In claim 2 at column 4, line 3, change "claim 15" to --claim 1--.

In claim 3 at column 4, line 8, change "claim 15" to --claim 1--.

In claim 4 at column 4, line 13, change "claim 15" to --claim 1--.

In claim 8 at column 4, line 28, before "material", insert --granular--.

In claim 12 at column 4, line 46, delete "product".

Signed and Sealed this

Thirteenth Day of February, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,435,832

DATED : July 25, 1995

INVENTOR(S) : Kepplinger et al.

It is certified that error appears in the above-identified patent and that said Letters Patent is hereby corrected as shown below:

On the title page, item [ 73 ] Assignee: change the Assignee's name to --Deutsche Voest-Alpine Industrieanlagenbau GmbH--.

Signed and Sealed this

Nineteenth Day of August, 1997

*Attest:*

BRUCE LEHMAN

*Attesting Officer*      *Commissioner of Patents and Trademarks*